Aug. 11, 1964  M. J. LAMBERTI  3,144,183
COLLAPSIBLE BAGGAGE CARRIERS FOR AUTOMOBILES
Filed Jan. 25, 1962  2 Sheets-Sheet 1
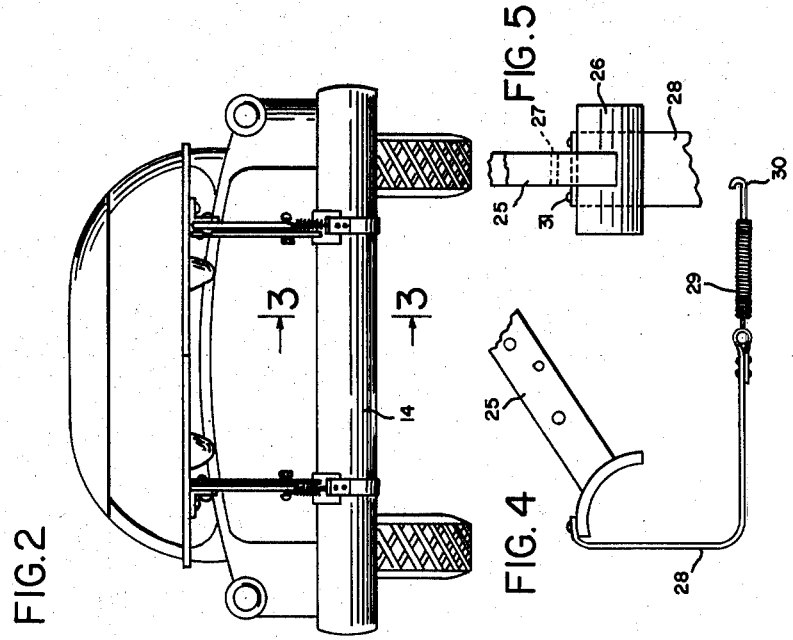
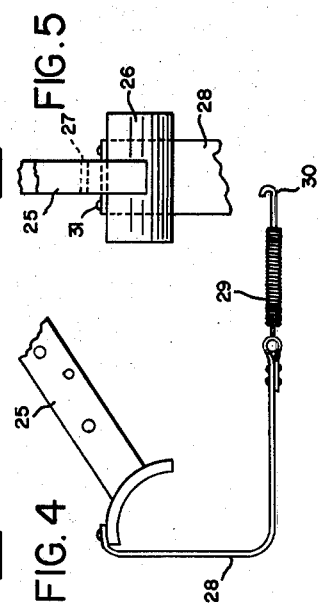
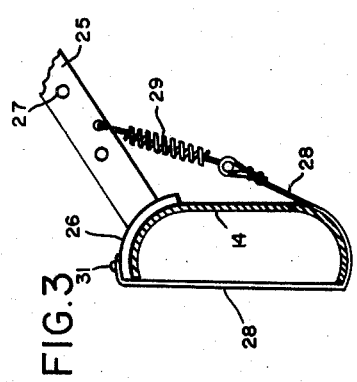
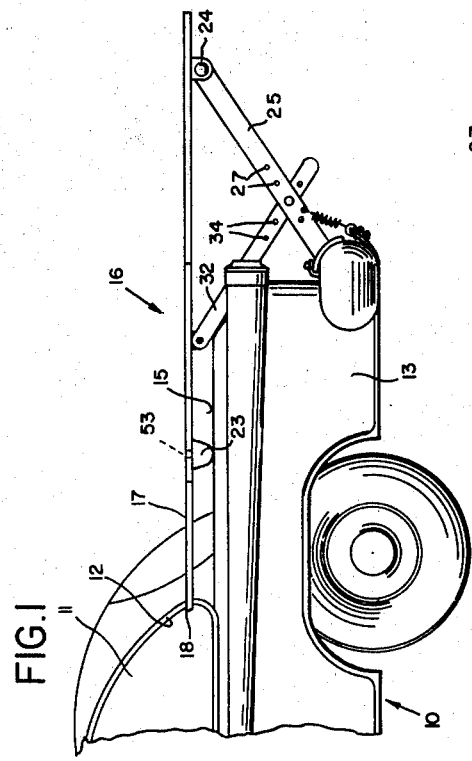
INVENTOR.
MARTIN J. LAMBERTI
BY *J. Ledermann*
ATTORNEY

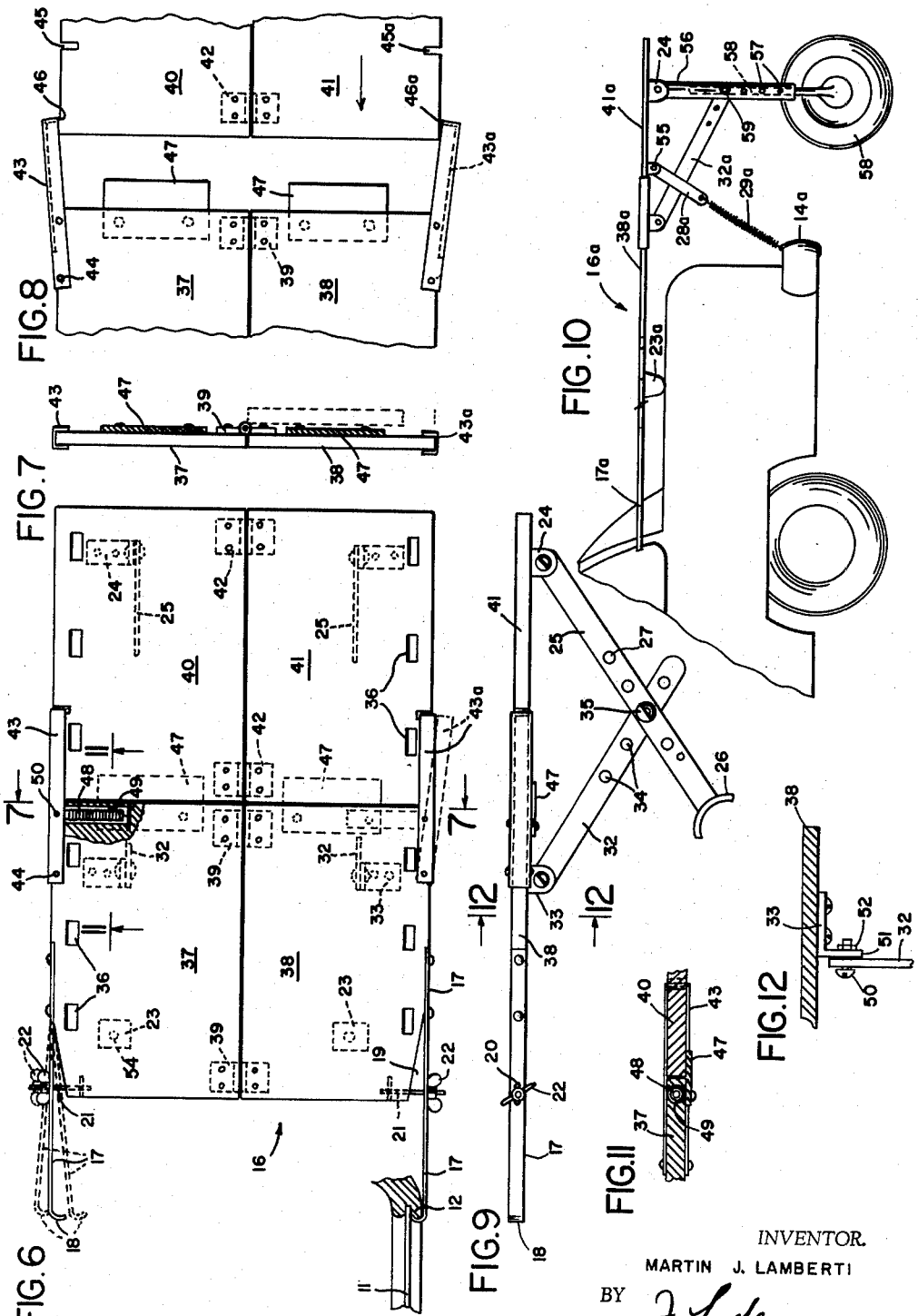

United States Patent Office 3,144,183
Patented Aug. 11, 1964

3,144,183
COLLAPSIBLE BAGGAGE CARRIERS
FOR AUTOMOBILES
Martin Joseph Lamberti, 116—02 232nd St.,
Cambria Heights, N.Y.
Filed Jan. 25, 1962, Ser. No. 168,752
2 Claims. (Cl. 224—42.07)

This invention relates to accessory baggage carrying means for passenger automobiles. Although the compartment under the rear deck of contemporary automobiles provides substantial space for ordinary purposes, such space is insufficient at times to hold the baggage and other equipment which it is desired to accompany the passengers on some trips, especially when one or more pieces of such equipment are too large to be accommodated in the baggage compartment.

It is an important object of the present invention to provide a baggage carrying rack adapted to be supported primarily on the rear deck of the car in conjunction with the rear bumper, with additional means being provided to secure the rack to the frames of the rear windows of the car.

A further object of the invention is the provision of a rack along the lines above-mentioned in a collapsible form so that it may readily be detached from the vehicle and collapsed into a small parcel so that it may normally be stored out of the way in the deck compartment of the car, or elsewhere.

A still further object of the invention is the provision, as a modification, of a collapsible baggage rack equipped with collapsible and adjustable auxiliary rear wheels in the fashion of a trailer.

The above as well as additional objects will be clarified in the following description wherein reference numerals refer to like-numbered parts in the accompanying drawing. It is to be noted that the drawing is intended primarily for the purpose of illustration and that it is therefore neither desired nor intended to limit the invention to any or all of the details of construction shown or described except insofar as they may be deemed essential to the invention.

Referring briefly to the drawing,

FIG. 1 is a fragmentary side elevational view of a passenger automobile having the preferred form of the baggage carrying rack mounted thereon.

FIG. 2 is a rear elevational view of the same.

FIG. 3 is an enlarged fragmentary sectional view taken on the line 3—3 of FIG. 2, showing the means for supporting the rear portion of the rack on the bumper in engaging position.

FIG. 4 is a fragmentary view of said means of FIG. 3 per se, in disengaged position.

FIG. 5 is a view of the means of FIG. 4 looking at FIG. 4 from right to left.

FIG. 6 is a top plan view of the baggage rack per se in extended position, partly in section.

FIG. 7 is a sectional view taken on the line 7—7 of FIG. 6.

FIG. 8 is a fragmentary top plan view of the baggage rack per se, showing the front and rear portions thereof in partly separated position.

FIG. 9 is a side elevational view of the rack per se.

FIG. 10 is a fragmentary side elevational view of an automobile with the modified form of baggage rack mounted thereon.

FIG. 11 is a sectional view taken on the line 11—11 of FIG. 6.

FIG. 12 is a sectional view taken on the line 12—12 of FIG. 9.

Referring in detail to the drawing, the numeral 10 indicates a passenger automobile having the side rear windows, as usual, one of which is indicated at 11, the rearward portion of the molding or frame of the window being indicated at 12. The rear deck which extends rearward from the vehicle passenger compartment is shown at 13, in which is the usual baggage compartment, not shown, covered by the top or lid 15. The usual rear bumper is indicated at 14.

The accessory baggage rack of the present invention includes the platform 16 which will be described in detail below. At opposite forward side edges of the platform more or less resilient or springy clamping members or fingers 17 are anchored to the platform and extend forward therefrom, terminating in oppositely disposed curved jaws or hooks 18 which face generally inward toward each other. The front corners of the platform are cut away to provide a clearance space 19 to permit inward flexing of the members 17. A slot 20 is provided in each member 17, and a screw 21, anchored in the cut-away edge of the platform corner extends through this slot. A wing nut threaded on the screw serves to flex the member 17 inward, that is, the part thereof which extends beyond the side edge of the platform past the cut-away 19 and the front end of the platform. The nut is shown at 22. The jaws 18 are preferably covered or coated with a cushioning material, which may be rubber, felt, or the like, not shown.

Mounted on the underside of the platform and transversely spaced, are rubber buffers 23, so that when the platform is mounted in position as shown in FIG. 1 these buffers rest upon the deck cover 15 and prevent scratching thereof. Pivoted at their upper ends to brackets 24 on the underside of the platform at or near the rear end thereof are transversely spaced rigid legs 25 having on their lower ends arcuate feet 26 adapted more or less to conform to the curvature of the bumper 14 on which they are adapted to rest. These feet are also preferably coated on the bottom with a padding or cushioning material, not shown, to prevent scratching of the bumper. The legs 25 are provided with longitudinally spaced openings or holes 27. A strap 28 of leather or other suitable material has one end secured to the front edge of the foot 26 and on its other end has a coiled spring 29 terminating in a hook 30. This strap may be secured to the foot 26 in any desired manner such as, for example, by rivets 31. With a leg 25 positioned as shown in FIG. 1 and FIG. 3, the strap 28 is passed down about the front side of the bumper and upward around the bottom edge thereof and with the strap and spring sufficiently tautened the hook 30 is engaged in a suitably positioned hole 27 in the leg 25 to hold the leg firmly in place but with sufficient yieldability provided by the spring to take up road shocks.

Additional props or support legs 32 are pivoted at their upper ends to brackets 33 on the underside of the platform forward of the bumper and are also provided with spaced holes 34. By means of a pivot pin 35 which may be a screw bolt or the like passed through a suitably positioned hole in each of the legs 25 and 32, the leg 32 may be supported at the proper angle to the leg 25 to provide additional support for the platform 16, and thus aid to maintain the platform in horizontal position.

In mounting the platform on the vehicle in the position shown in FIG. 1, the two clamping members or arms 17 are pried apart sufficiently to permit the jaws 18 to engage and grip the window frame portions 12 on the two sides of the car. In order to assure holding of the jaws in position the wing screws or nuts 22 are tightened. Slots 36 are provided, preferably along both side edges of the platform, so that straps, not shown, may be passed through them and around baggage or other articles placed on the platform.

The platform 16 is illustrated as being formed of two laterally divided sections 37 and 38 hinged together by hinges 39 on the undersides thereof, these two sections constituting the forward half of the platform 16. A second pair of similarly divided sections are hinged together by hinges 42 in the same manner, and they constitute the rearward half of the platform. It is obvious that upon dismantling the platform the sections 37 and 38 may be folded together about their hinges, and likewise the sections 40 and 41 may be folded together.

Provision is made for interlocking the forward half 37, 38 of the platform to the rearward half 40, 41 when the same are in the extended position shown in the various views. Such a means is illustrated in FIGS. 6, 7 and 8. A channel member 43 is pivoted at 44 about one longitudinal edge of the section 37 and has a length such that it extends beyond the rear edge of the said section and is adapted to engage the forward portion of the outer edge of the section 40. For this purpose, and as shown, the said forward portion of the outer edge of the section is provided with a notch 45 in which a nose 46 on the end of the member or link 43 is adapted to engage. It is apparent that when the front and rear halves of the platform are brought together from the position shown in FIG. 8 to that shown in FIG. 6, with the link swung out into the position shown in FIG. 8, upon swinging the link back to engage the nose 46 in the notch 45 the two halves will be locked together on that side of the platform. The same means is provided on the opposite edges of the two halves, and parts similar to those just described are indicated therefor by the same reference numerals followed by the suffix "a." To provide greater stability to the joined halves of the platform 16, rigid plates 47 secured to and extending rearward from the undersides of the sections 37 and 38 engage and support the undersides of the sections 40 and 41, respectively.

In order normally to urge the hooked or nosed links 43, 43a to swing inward into engaging position to interlock the two halves of the platform, each link is provided with a coiled spring 48 (of which but one is shown in FIG. 6) anchored in a cut-out or socket 49 extending at right angles to the longitudinal edge of the section, as the section 37. The outer end of the spring engages the link and its tension normally urges the link to swing inward. Hence, when the two halves are positioned as shown in FIG. 8, sliding of the same together will result in the noses of the links entering the notches in the sections 40, 41 and thus maintain the two halves interlocked.

To facilitate storing of the dismantled platform, the pivot connections of the legs 25 and 32 with their respective brackets 24 and 33 are all also demountable. Such a demountable pivot connection is shown in FIG. 12, wherein a screw bolt 50 passing through the end of the leg 32 and the ear 51 of the bracket 33 is releasably secured by a nut 52. Although not shown, the screw 50 may be a wing screw and the nut 52 may be a wing nut.

Once the platform 16 has been assembled and mounted on a particular automobile the relative positions of engagement of the legs 25 and 32 on each side are fixed, that is, the hole 27 and the hole 34 of the respective legs through which the pivot 35 is passed, will remain the same so that these two legs need not be separated. However, after they have been detached from the brackets 24 and 33, they may be swung about the pivot 35, preferably in a clockwise direction, FIG. 9, to reduce them to minimum bulk.

In order to permit the two sections 37, 38 to be folded together into close proximity about their hinges, the rubber buffers 23 are also made removable, being provided with pins or screws 53 registrable in holes 54 in these sections, either frictionally or threadably.

FIG. 10 illustrates a modified form, and therein parts which are similar to parts previously described bear the same reference numeral followed by the suffix a. The strap 28a, however, is secured to the underside of the adjacent rear half section of the platform 16a on a bracket 55, and instead of the leg 25 a leg 56 is pivoted to the bracket 24. The leg 56 is tubular and provided with spaced holes 57 therethrough, in which a rod 58, provided with similarly spaced holes, is slidable, and a wheel 58 is mounted on the rod. By engaging a pin 59 in a hole 57 and a hole in the rod 56 as well as a hole in the leg 32a, the wheel may be positioned at a proper level to support the rear end of the platform and maintain the same horizontal. Upon dismantling the leg 56 and the leg 32a are taken down together in the same manner as previously described for the legs 25 and 32. Thus in this form the platform has wheels at the rear so that it resembles a trailer.

The dismantled and collapsed platform sections can readily be conveniently stored, together with the other removable parts, in a small space, either within the rear deck compartment of the car, on in a garage, etc., when not being used.

The invention having thus been described, what is claimed and desired to be secured by Letters Patent is as follows:

1. A baggage platform for an automobile which includes a rear deck provided with a cover and a rear bumper and two rear side windows each provided with a molding with an approximately upright portion at the rear of the window opening, the platform being adapted to be mounted above said deck cover in substantially horizontal position, the platform having a length sufficient to include a rearward extension beyond the rear bumper, a rigid depending leg pivotally secured at one end thereof to the rear portion of each side of the platform and provided with a foot positiond in a position of rest upon the bumper, said leg extending in a forward and downward direction, means for securing said foot in said position of rest, and resilient forwardly extending fingers on the sides of the platform having means on their extremities for engaging said upright portions of the rear window moldings, the legs having a length such as to position the platform substantially in the horizontal plane of said extremities of said forward extensions, said means on said fingers comprising curved hooks extending inward toward each other and in which said portions of said moldings register and releasable means for urging said fingers and hence said hooks toward each other, said platform being rectangular in outline and consisting of two transversely divided separate portions positioned edge to edge and having means for interlocking the same, one of said separate portions having links pivoted to the longitudinal edges thereof, the other of said separate portions having notches therein, said links having noses projecting from the ends thereof remote from the pivotal axes thereof and engageable in said notches, and means for normally urging said links into position to engage said noses in said notches.

2. A baggage platform according to claim 1, said last-named means comprising tension springs anchored to said one of said separate portions and secured to said links between the pivotal axes of the links and said noses.

References Cited in the file of this patent
UNITED STATES PATENTS

| | | |
|---|---|---|
| 906,452 | McCleer | Dec. 8, 1908 |
| 2,338,955 | Metcalf | Jan. 11, 1944 |
| 2,777,625 | Kronhaus et al. | Jan. 15, 1957 |
| 2,779,524 | Carlson | Jan. 29, 1957 |
| 2,809,046 | Andersson | Oct. 8, 1957 |
| 3,015,423 | Garraway | Jan. 2, 1962 |
| 3,058,636 | Bilbeisi | Oct. 16, 1962 |